(12) United States Patent
Entringer et al.

(10) Patent No.: US 9,047,527 B2
(45) Date of Patent: Jun. 2, 2015

(54) METHOD FOR READING A BARCODE

(71) Applicant: EM Microelectronic-Marin SA, Marin (CH)

(72) Inventors: Christophe Entringer, Corcelles-pres-Concise (CH); Julien Coltier, Les Gras (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/210,762

(22) Filed: Mar. 14, 2014

(65) Prior Publication Data

US 2014/0263653 A1 Sep. 18, 2014

(30) Foreign Application Priority Data

Mar. 18, 2013 (EP) ..................................... 13159739

(51) Int. Cl.
*G06K 5/04* (2006.01)
*G06K 7/14* (2006.01)
*G06K 7/10* (2006.01)

(52) U.S. Cl.
CPC .......... *G06K 7/1439* (2013.01); *G06K 7/10772* (2013.01); *G06K 7/10782* (2013.01)

(58) Field of Classification Search
CPC .......... G06K 7/10772; G06K 7/10782; G06K 7/1439

USPC .................. 235/435, 462.01, 462.08, 462.12, 235/462.24
See application file for complete search history.

(56) References Cited

U.S. PATENT DOCUMENTS

| 7,090,129 B2 * | 8/2006 | Tatsuta ........................ 235/435 |
| 2004/0217172 A1 | 11/2004 | Tatsuta |
| 2006/0082557 A1 | 4/2006 | Ericson et al. |
| 2009/0110325 A1 | 4/2009 | Smith et al. |

OTHER PUBLICATIONS

European Search Report issued Dec. 6, 2013 in EP application 13159739, filed on Mar. 18, 2013 ( with English Translation).

* cited by examiner

*Primary Examiner* — Seung Lee
(74) *Attorney, Agent, or Firm* — Oblon, McClelland, Maier & Neustadt, L.L.P.

(57) ABSTRACT

Method for reading a barcode by means of an optical reader arranged to capture at a determined sampling frequency a series of partial images of the barcode by a sensor having at least one line of pixels. According to the invention it is provided to determine in each partial image a logical value as a function of the light intensity received by a central pixel of the line of pixels and a corresponding bar width when this bar is completely incorporated into the partial image in question. By only setting a maximum speed for the speed of movement of the barcode and dimensioning the line of pixels to ensure that each bar of this barcode is completely incorporated into a partial image at least once, the sequence of bits defined by the barcode is determined by means of an algorithm ignoring the duplications detected in consecutive partial images.

6 Claims, 2 Drawing Sheets

METHOD FOR READING A BARCODE

This application claims priority from European Patent Application No. 13159739.5 filed Mar. 18, 2013 the entire disclosure of which is incorporated herein by reference.

TECHNICAL FIELD

The present invention relates to the field of methods for reading a barcode by means of an optical reader arranged to capture a series of partial images of the barcode on a sensor of this reader at a certain sampling frequency. In other words, reading is conducted by optical barcode scanning. This reading consists of capturing partial images that the sensor converts into analog electrical signals and these are processed and converted into digital and/or numerical signals to ultimately obtain a bit sequence.

In general, a barcode consists of a plurality of bars of variable widths that define a bit sequence.

TECHNOLOGICAL BACKGROUND

Various barcode readers have been proposed. The first type of devices are designed to read the entire barcode in a single scan. These first devices require long sensors that are expensive and are bulky. The second type of readers are optical scanner-type readers. In this case, the barcode is scanned by a light beam, the reflection of which is received by an optical sensor. In the case where the sensor remains fixed, as in U.S. Pat. No. 5,272,323, this sensor has a length similar to that of the first devices. In all the known cases, whether the sensor is fixed or configured to be movable during the scan, the scanning speed must be controlled, in particular kept constant. This complicates the reading process and restricts the applications for portable readers. Such readers are not suitable for reading a barcode moving at a speed that is not constant, as in the case of a chute or slide on an inclined plane involving acceleration.

SUMMARY OF THE INVENTION

The aim of the present invention is to provide a barcode reader that is not bulky and is easy to use in numerous situations. In particular, the object of the present invention is to provide a reader, which is portable and with which a user can perform the relative movement necessary for the scan without controlling the relative speed, or a fixed reader that can read a barcode on an object moving at a speed that is not constant.

For this purpose, the present invention relates to a method for reading a barcode by means of an optical reader arranged to capture at a determined sampling frequency a series of partial images of the barcode by a sensor having at least one line of pixels, wherein the barcode consists of a plurality of bars of variable width that define a bit sequence. This method has the following steps:
- A) the sensor is moved along the barcode parallel to the line of pixels at any speed of movement less than a maximum speed, wherein this maximum speed is defined so that the shift between two consecutive partial images is less than the width of the image of a bar unit of the barcode;
- B) the length of the line of pixels is less than the length of the theoretical image of the barcode at the sensor and more than the width of the image of a bar of maximum width on the sensor;
- C) for each partial image captured by the sensor a logical value is determined by the level of light intensity received by at least one pixel located more or less in the centre of the line of pixels;
- D) for each partial image captured by the sensor the width of the bar corresponding to said logical value, when this is defined, is measured when this bar is incorporated completely into this partial image;
- E) when the same logical value is obtained for two consecutive partial images in step C), a single logical value and the width of the corresponding bar are retained to establish the bit sequence.

As a result of the features of the reading method of the invention, it is possible to read a barcode in a reliable manner using a sensor of relatively small dimensions by scanning the bar code without control or automatic control of the speed of passage/relative movement between the sensor and the barcode, wherein only a maximum speed is set. This maximum speed can be high so that in practice it does not limit the use of the reader.

Other particular features of the invention will be outlined below in the detailed description of the invention.

BRIEF DESCRIPTION OF THE DRAWINGS

The invention will be described below with the aid of attached drawings given by way of example that is in no way restrictive.

DETAILED DESCRIPTION OF THE INVENTION

Figure 1:
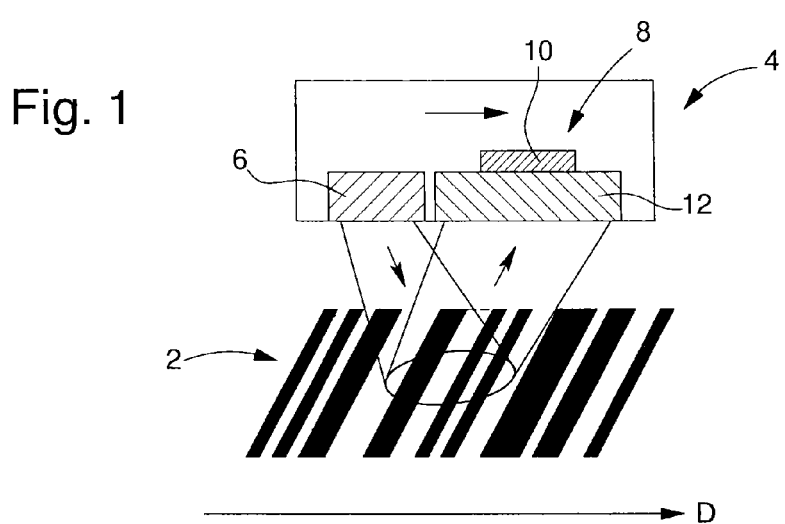
FIG. 1 is a schematic view of a reader for implementing the method for reading a barcode according to the invention.

A mode of execution of the method for reading a barcode according to the invention will be described below with reference to FIGS. 1 to 4. It is provided to use a reader 4 with a light source 6 which directs a light beam to the barcode 2 to be read. The reflected beam is at least partially incident on the receiver 8, which comprises an optical sensor 10 and a focussing system 12 arranged in front of the sensor 10 to form a partial image of the barcode on this sensor, i.e. on the pixels of the sensor.

The sensor 10 comprises at least one line of pixels 14 in the direction of movement D provided for the reader. The optical reader 4 is arranged to capture a series of partial images 18 of the barcode 2 at least on the line of pixels 14 at a determined sampling frequency.

Figure 2:
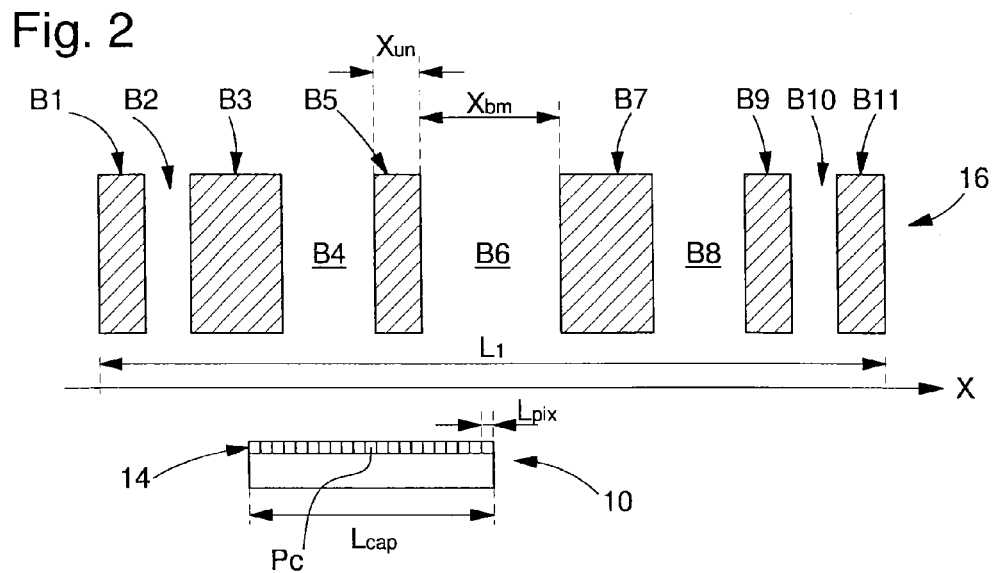
FIG. 2 is a schematic view of a part of the theoretical image of a barcode at a sensor of the reader during a reading of a barcode according to the invention.

The barcode comprises a plurality of bars of variable widths that define a bit sequence. The bars of the barcode are reduced by a certain factor by the focussing system 12 so that they have reduced widths in the image formed on the sensor 10. An axis X parallel to the line of pixels 14 and to the direction of movement D of the reader is defined at the sensor. The widths of the images of the various bars of the barcode are given on this axis X. The theoretical image 16 of the barcode (or of a part thereof) is shown in FIG. 2. The image is referred to as a theoretical image here when a representation of the barcode on axis X has an overall dimension that is larger than the length $L_{sens}$ of the sensor so that it corresponds to the synthesis of several partial images at the sensor when this is moved along axis X. Thus, the widths of the bars of this theoretical image are definitely those resulting from the partial images captured by the sensor.

In FIG. 2 the theoretical image 16 is formed from a plurality of bars B1 to B11 and has a length L1. The bars B1, B2, B5, B9, B10 and B11 are bar units with a unit width $X_{un}$. They each correspond to a single logical data element (bit '1' or '0'). Other bars B3, B4, B7 and B8 have double the width compared to a bar unit. They correspond to the series of two identical bits (double '1' or double '0'). Finally, bar B6 has a width that is triple that of a bar unit. It corresponds to a series of three identical bits. In the example given in the figures the triple width corresponds to the maximum width $X_{bm}$ for a bar of the barcode to be read.

The line of pixels 14 is composed of twenty one pixels with a width $L_{pix}$ (dimension of a pixel along axis X). It will be noted that it is possible to provide several parallel lines of pixels. In this case, the light intensities received by the pixels with the same position on axis X can be averaged or added using variants of the reading method of the invention. The central pixel $P_c$ of the sensor 10 plays an important part in the method of the invention, since it is the light intensity received by this central pixel that determines in a captured partial image the single logical data element retained and utilised in this partial image, as will be explained below. However, it will be noted that it is possible in variants to take several, e.g. two or three, pixels from the central zone to define the single logical data element utilised. Thus, for example, in the case where the number of pixels of the line of pixels is an even number, the two pixels in the centre can be considered. When these two pixels do not define the same logical value (bit '0' or '1'), the logical value for the partial image in question will be said to be undefined.

Figure 3:
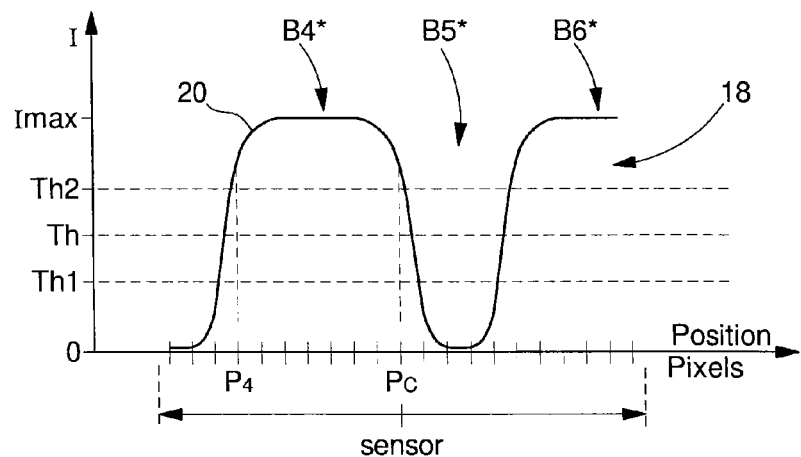
FIG. 3 is a graph of the light intensity received by the sensor of the reader when this sensor is positioned relative to the barcode in the configuration of FIG. 2.

The logical value for a given partial image is therefore defined by the central pixel $P_c$ or by some pixels of the central zone of at least one line of pixels of the optical sensor. To determine the logical value of the central pixel $P_c$, the light intensity received by this central pixel is measured on the intensity curve 20 of a partial image 18. In FIG. 3 the curve 20 results from the capture of a partial image with a positioning of the optical sensor 10 according to FIG. 2. This curve 20 is formed by the intensity profiles B4* and B5* corresponding to the complete detection of bars B4 and B5 respectively; and also on the partial intensity profile B6* corresponding to a part of bar B6. In a first variant, a single threshold value Th is provided that corresponds approximately to an average intensity between the minimum light intensity and the maximum light intensity $I_{max}$. In this case, a logical value will always be defined. In another variant, a lower threshold value Th1 and an upper threshold value Th2 are provided. When the detected light intensity is lower than Th1, the logical value is '1' and when the logical value is higher than Th2, the logical value is '0'. The detection of a light intensity between Th1 and Th2 gives an undefined logical value. In the example in FIG. 3, the two variants give a logical value '0' corresponding to the logical value associated with bar B4.

It is then provided to determine the width of block B4 detected by the central pixel $P_c$ in order to determine the number of identical bits defined by this block B4. It will be noted that this width can only be measured in a partial image if the whole of the block is present in this partial image. This is the case in FIG. 3. Pixels P4 to $P_c$=P11 all receive a light intensity higher than TH2. Thus, the width of bar B4 is determined as being equal to eight times the length $L_{pix}$ of a pixel. In the example shown in FIGS. 2 and 3, the width $X_{un}$ of a bar unit is equal to four times the length $L_{pix}$. Consequently, bar B4 corresponds to a double bar, i.e. a double '0'. It will be noted that if the determination of the width of bar B4 gave the result of seven or nine times the length $L_{pix}$, the algorithm will decide that it is a double bar. Conversely, if there are six or ten pixels with the same logical value in this case, the width is undefined because it is exactly between two widths of standard bars. This width can possibly still be determined correctly in a following partial image, in particular when it is a bar of maximum width, as will be understood from the following. If this is not the case, there is a reading error and the reader will indicate this fact.

Following the above outline relating to FIGS. 1 to 3, it is now possible to describe the various steps of the reading method according to the invention. This method comprises the following steps:

A) the sensor 10 is moved along the barcode 2 parallel to the line of pixels 14 at any speed of movement provided to be less than a given maximum speed $V_{max}$, wherein this maximum speed is defined so that the shift between two consecutive partial images is less than the width $X_{un}$ of the image of a bar unit of the barcode 2;

B) the length $L_{sens}$ of the line of pixels 14 is less than the length of the theoretical image L1 of the barcode at the sensor and more than the width $X_{bm}$ of the image of a bar of maximum width on the sensor;

C) for each partial image captured by the sensor a logical value is determined by the level of light intensity I received by at least one pixel $P_c$ located more or less in the centre of the line of pixels 14;

D) for each partial image captured by the sensor the width of the bar corresponding to said logical value, when this is defined, is measured when this bar is incorporated completely into this partial image;

E) when the same logical value is obtained for two consecutive partial images in step C), a single logical value and the width of the corresponding bar are retained to establish the bit sequence.

As already explained above, it will be noted that the logical value determined in step C) can be either defined and amount to '1' or '0', or undefined. Moreover, in step D), when the bar corresponding to the logical value measured by the central pixel $P_c$ is not completely incorporated into the captured partial image, this width is undefined for this partial image.

Step A) is noteworthy in that no constant speed is required, only a maximum speed $V_{max}$ is given by a condition of the method, i.e. the shift between two consecutive partial images is less than the width $X_{un}$ of the image of a bar unit of the barcode. It is thus understood that this maximum speed is dependent on the sampling frequency $F_{flash}$ and on the width of the image of a bar unit (hence, the real width and the reduction factor of the focussing system of the reader are parameters determining the authorised maximum speed). For example, if the image of a bar unit has a width $X_{un}$=1 mm and the frequency of flashes $F_{flash}$ amounts to 100 Hz, then Vmax<$X_{un} \cdot F_{flash}$=0.001·100=0.1 ms$^{-1}$. Therefore, in this example the reader can be moved at any speed less than 10 cm/s. By increasing $F_{flash}$, the maximum speed will be increased proportionally. Thus, where $F_{flash}$=500 Hz, the speed of passage of the barcode can be 50 cm/s, and this is a relatively high speed that is generally sufficient for a manual reading of a barcode. It will be noted that the speed of passage can vary during the course of the reading of a barcode.

The objective of step A) is to ensure that each bar, in particular each bar unit, is detected. In other words, within the framework of the invention step A) ensures that each bar is detected at least once by the central pixel $P_c$ or by the pixels of the central zone of the line of pixels 14, depending on the chosen variant.

In a preferred variant, to increase the detection reliability, it is provided that the maximum speed $V_{max}$ is chosen so that the shift between two consecutive partial images on the sensor 10 is less than or equal to the width $X_{un}$ of the image of a bar unit reduced by the dimension $L_{pix}$ of a pixel of the sensor along axis X (direction of movement of the reader). In another preferred variant, which is advantageously combined with the aforementioned preferred variant, the image of the bar unit on the sensor has a width $X_{un}$ larger than three times the dimension $L_{pix}$ of a pixel of the sensor along axis X.

Step B) mentions that the reader can only operate with a scan of the barcode. Its objective is then to ensure that a bar of maximum width $X_{bm}$ can be captured entirely in at least one partial image so that its width can be determined in this at least one partial image. In a preferred variant of the invention, it is provided that the length of the line of pixels $L_{sens}$ is equal to or greater than the sum of the width $X_{bm}$ of the image of a bar of maximum width, the width $X_{un}$ of the image of a bar unit and three times the dimension $L_{pix}$ of a pixel of the sensor along axis X (direction of movement of the reader). With respect to the minimum number of pixels $Nb_{pix}^{min}$ of the line of pixels 14, it is provided within the framework of this preferred variant that $Nb_{pix}^{min}$ is given by the following mathematical formula:

$$Nb_{pix}^{min} = INT[NPUB + NPBLM] + 4$$

where NPUB is the real number of pixels corresponding to the image of a bar unit (NPUB=4 in the example of FIGS. 2 and 3) and NPBLM is the real number of pixels corresponding to the image of a bar of maximum width (NPBLM=3·4=12 in the example of FIGS. 2 and 3). INT[Y] is the integer function of Y.

Figure 4:
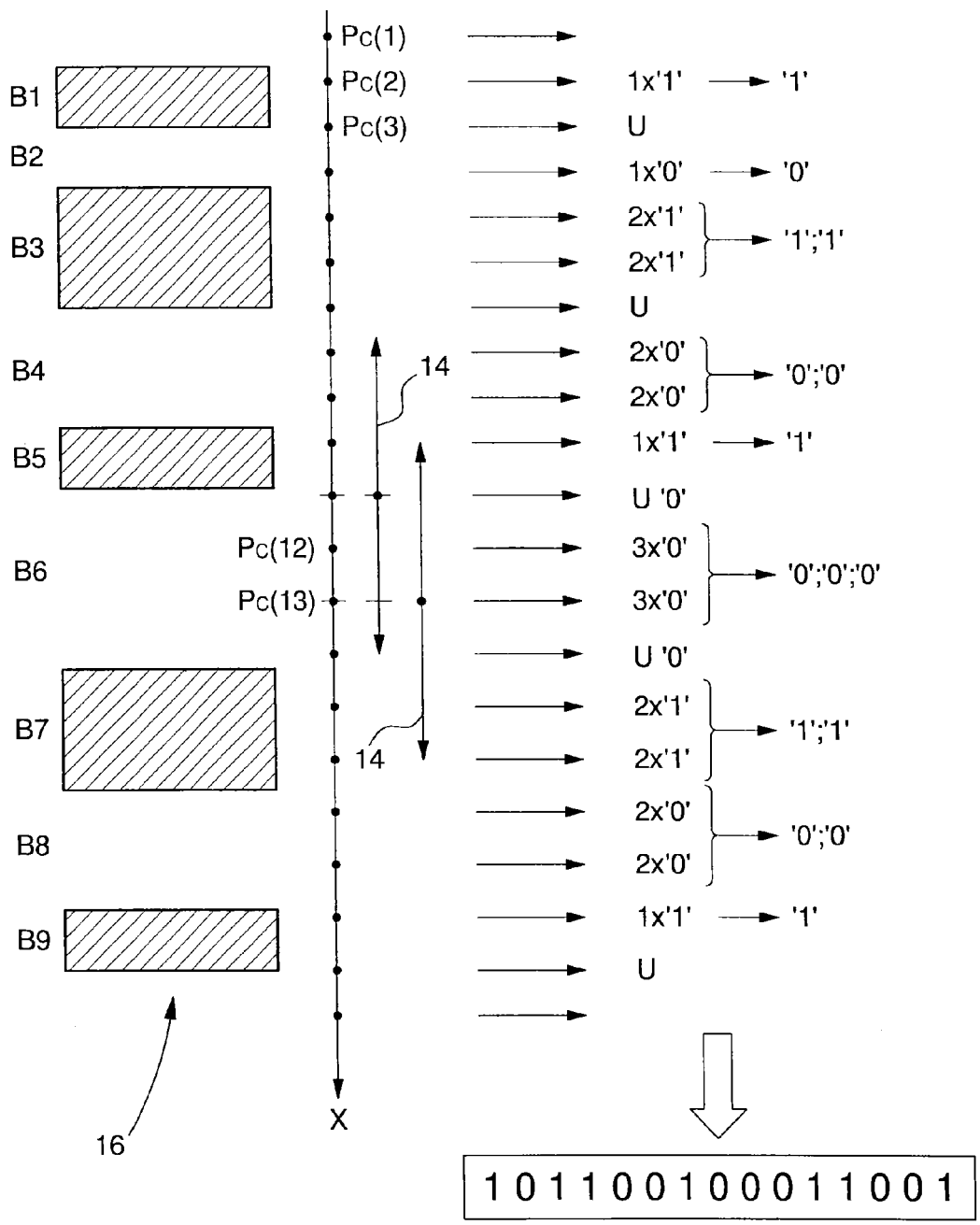
FIG. 4 is a schematic view of the operation of the algorithm according to the method of the invention for decoding the logic sequence defined by a barcode example.

Steps C) to E) of the reading method will be illustrated with the aid of FIG. 4. This FIG. 4 shows the theoretical image 16 of a barcode. Shown on axis X in succession are the positions $P_c(n)$ of the central pixel $P_c$ for a plurality of consecutive partial images resulting from a certain speed of passage and the sampling frequency (also referred to as frequency of flashes or frequency of partial image capture). To prevent overcrowding of the drawing, the extent of the line of pixels 14 of the sensor 10 has been shown for only two positions $P_c(11)$ and $P_c(13)$. During a relative movement of the reader 4 in relation to the barcode this reader determines a logical value '1' at the position $P_c(2)$ and easily measures a unit width $X_{un}$. The algorithm implemented in the reader records 1×'1' (the logical value '1' once). In the next position the central pixel is located exactly at the interface between two bars. An undefined logical value marked U is thus obtained. No bar width is measured in the variant shown. The algorithm then records 1×'0' in the next partial image.

The double width bar B3 is then reached. In the position $P_c(5)$ the sensor determines a logical value '1' and a double width. The algorithm records 2×'1' (logical value '1' twice). In the next position $P_c(6)$ the logical value of the central pixel remains '1'. A double width is measured once again. The algorithm ultimately ignores this new result because the logical value has not changed. It may initially record the two identical results and remove the duplications in a later step. It will be noted that as soon as it detects the same logical value in two consecutive partial images, the algorithm can refrain from measuring the width of the bar again, since it is necessarily the same bar. A new measurement of the width can, however, serve as a confirmation measurement or to clarify the width of the bar in the case where the preceding result does not allow this width to be clearly determined. Thus, alternative logical values are collected with the widths of the corresponding bars.

In position $P_c(11)$ a logical value '0' is determined on the central pixel, but the corresponding bar is not completely incorporated into the partial image in question (this is a bar of maximum width $X_{bm}$). The algorithm records U'0', i.e. a logical value '0' with an undefined bar width. In this case, it may also ignore the logical value and wait for the next partial image to record the data relating to the undefined bar. However, it is useful to check that the following logical value is actually identical since, if the following logical value is not identical, it would be a reading error. In the two following partial images the measurement device detects bar B6 and records 3×'0' at least once. Finally, the algorithm only retains a single 3×'0' bar, i.e. three times the logical value '0'. Thus, the reader according to the invention faithfully recreates the logic sequence corresponding to the read barcode, as indicated at the bottom of FIG. 4.

The invention claimed is:

1. A method for reading a barcode by an optical reader arranged to capture at a determined sampling frequency a series of partial images of the barcode by a sensor having at least one line of pixels, wherein the barcode includes a plurality of bars of variable widths that define a bit sequence, and wherein this method comprises:

A) moving the sensor along the barcode parallel to said line of pixels at any speed of movement less than a maximum speed, wherein this maximum speed is defined so that a shift between two consecutive partial images is less than a width ($X_{un}$) of an image of a bar unit of said barcode;

B) a length of said line of pixels is less than a length of a theoretical image of the barcode at the sensor and more than the width of the image of a bar of maximum width on the sensor;

C) for each partial image captured by the sensor, determining a logical value by a level of light intensity received by at least one pixel located more or less in a center of said line of pixels;

D) for each partial image captured by the sensor, measuring the width of the bar corresponding to said logical value, when this is defined, when this bar is incorporated completely into this partial image;

E) when a same logical value is obtained for two consecutive partial images in the determining the logical value, retaining a single logical value and the width of the corresponding bar to establish said bit sequence.

2. The method for reading a barcode according to claim 1, wherein said logical value determined in the determining the logical value is either defined and amounts to '1' or '0' or is undefined.

3. The method for reading a barcode according to claim 1, wherein the image of said bar unit on said sensor has a width, which is three times larger than a dimension of a pixel of the sensor in a direction of movement of the reader.

4. The method for reading a barcode according to claim 1, wherein said length of said line of pixels is equal to or greater than a sum of the width of the image of said bar of maximum width, the width of the image of said bar unit and three times a dimension of a pixel of the sensor in a direction of movement of the reader.

5. The method for reading a barcode according to claim 4, wherein a number of pixels of said line of pixels of the sensor is more than or equal to a minimum number of pixels $Nb_{pix}^{min}$ given by the following mathematical formula:

$$Nb_{pix}^{min} = INT[NPUB + NPBLM] + 4$$

where NPUB is a real number of pixels corresponding to the image of a bar unit and NPBLM is a real number of pixels corresponding to the image of a bar of maximum width.

6. The method for reading a barcode according to claim 1, wherein said maximum speed is chosen so that the shift between two consecutive partial images on the sensor is less than or equal to the width ($X_{un}$) of the image of said bar unit reduced by a dimension of a pixel ($L_{pix}$) of a sensor in a direction of movement of the reader.

* * * * *